Sept. 9, 1941.     S. B. GRIMSON     2,255,038
FILM GATE
Original Filed April 21, 1939

INVENTOR.
Samuel B. Grimson
Darby & Darby
His Attorney's

Patented Sept. 9, 1941

2,255,038

UNITED STATES PATENT OFFICE 2,255,038

FILM GATE

Samuel B. Grimson, New York, N. Y., assignor to Color Research Corporation, New York, N. Y., a corporation of Delaware Original application April 21, 1939, Serial No. 269,068. Divided and this application March 14, 1940, Serial No. 323,886

2 Claims. (Cl. 88—16.4)

This invention relates to a film gate structure for use in printing colored photographs, including motion pictures.

The general object of this invention is to provide a novel film gate combination including a diffraction grating and mechanism for positioning the diffraction grating axially, circumferentially, and transversely or radially in order to adapt it for use in a novel method of printing colored pictures.

This invention resides substantially in the combination, construction, arrangement, and relative location of parts, as hereinafter more fully explained.

This application is a division of my copending application Serial No. 269,068, filed April 21, 1939, for Color photography.

In some respects the subject matter herein disclosed is related to the subject matter of my copending application Serial No. 176,440, filed November 26, 1937, for Diffraction method and apparatus for color photography, now Patent No. 2,164,062.

Figure 1:
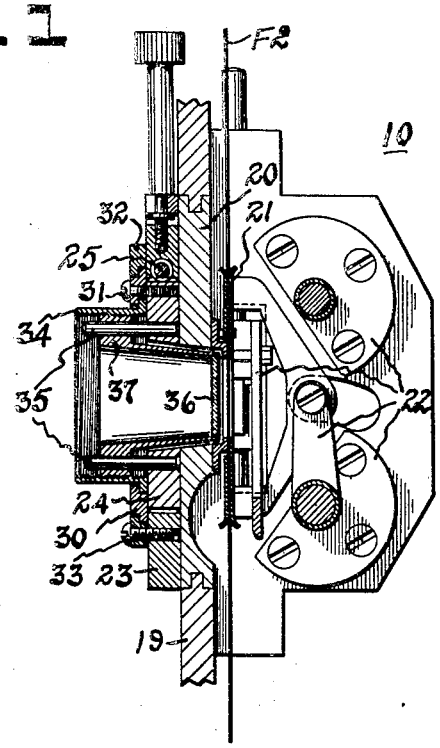
Figure 1 is a vertical, central, cross-sectional view of the novel unitary structure comprising the film gate, the diffraction grating, and the adjusting mechanism therefor of this invention.
Figure 2:
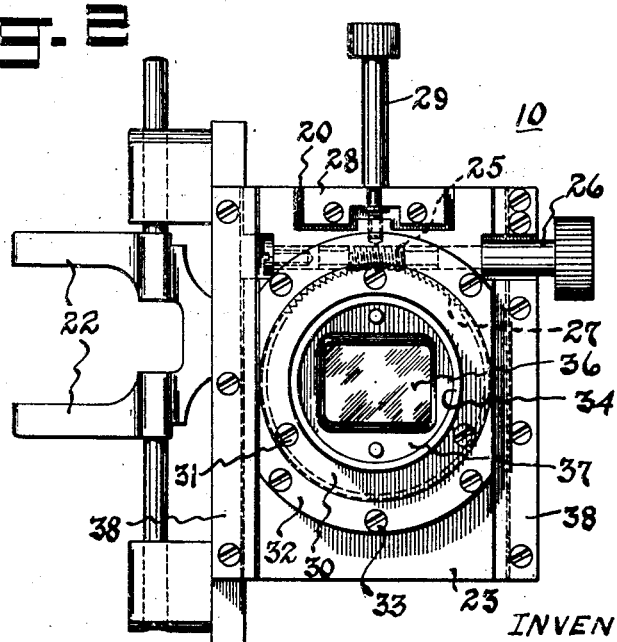
Figure 2 is a rear elevational view thereof.

Referring to Figures 1 and 2, there is illustrated a film gate of the well known Bell-Howell type, showing the mechanism 22 for moving the film on and off the registration pins and pulling it down. The film guide and pressure plate is shown at 21. The plate 20 is removably mounted on a suitable support 19. Mounted on the plate 20 is a plate 23, having an opening in which lies concentrically therewith a disc 24 having a central opening. The disc 24 is mounted for circumferential rotation by means of a worm 25 engaging teeth 27 on the periphery thereof. The worm is journaled in the plate 23 and is rotated by means of a thumb screw 26. The disc 24 is held in the opening of plate 23 by means of a ring 30 secured thereto by means of the screws 31 and cooperating with a corresponding ring 32 secured to the plate 23 by means of the screws 33. Thus the disc 24 may be given circumferential movement to the desired degree while it is held strictly in a plane parallel to the gate aperture. Secured to the top of plate 20 is a journal 28 for a vertical thumb screw 29 which is connected to the plate 23. The plate 23 is mounted in vertical guides formed by the bars 38 attached to the sides of plate 23. Thus by means of the thumb screw 29 the plate 23 may be given vertical movement, carrying with it the parts attached thereto, including the disc 24.

The tubular member 34, internally threaded, is provided with a flange which fits under a flange on the ring 30 so that the tubular member may be rotated. At 35 are a pair of pins mounted on the disc 24. Slidably mounted on the pins 35 is a casing 37 having an externally threaded flange, the threads of which engage the internal threads of the tubular member 34. The inner end of the casing 37 has mounted therein a diffraction grating 36 of the type known as a filled grating. As is well known in the art, the filled grating consists of a series of parallel lines extending across one surface of an optically flat piece of glass made by ruling them thereon and filling them in so that the filled ruled lines are rendered opaque and are separated by clear lines which are preferably, but not necessarily, one-third as wide as the ruled or opaque lines.

With this arrangement it will be seen that the diffraction grating can be very accurately positioned with respect to the film gate. It can be moved up and down, as previously described, with the thumb screw 29. It may be rotated in a vertical plane by means of the thumb screw 26 so that the horizontally ruled lines thereon may be placed exactly parallel in a horizontal direction with the lines on the black and white positive F2 registered in the film gate 21. The image structure of color separation film composed of linear densities is described in more detail in the said patent mentioned below. The diffraction grating may be adjusted in a direction at right angles to the plane of the film by rotating the tubular member 34. As this is rotated the casing 37 slides on the pins 35 so that the grating, the ruled surface of which is adjacent to the film F2, may be exactly positioned to give the overlapping focus described in connection with taking in the above mentioned Patent No. 2,164,062. It is of importance, of course, that in printing the diffraction grating have the lines thereof exactly parallel with the linear densities on the film F2 and be plane-parallel with the film.

It will be apparent from the above description that the novel features of this invention are subject to wide variation without departure from the scope of the novel subject matter herein disclosed. I do not, therefore, desire to be strictly limited to the disclosure as given for purposes of illustration, but rather to the scope of the claims granted me.

What I claim is:

1. A film gate mechanism for use in photographic printing processes employing a film bearing color separation linear densities, including a member having an aperture therein, means positioned adjacent said aperture for intermittently moving such film therepast and for holding it at said aperture during its periods of rest, a filled diffraction grating, a support for said grating for holding it close to said aperture and parallel thereto, means for varying the position of said grating support along an axial line at right angles to the plane of said aperture so that the grating may be spaced in desired parallel planes with respect to the plane of said aperture, means for rotating said grating support about said axial line, and means for moving the grating support in either direction along a line at right angles to said axial line, whereby the grating lines may be accurately positioned with respect to the linear densities on the film when at rest in said aperture.

2. A film gate structure of the type described including a support having an aperture therein, means for intermittently moving a film in the direction of its length past said aperture, means for holding the film flat at said aperture when at rest, a filled diffraction grating positioned close to said aperture and parallel thereto, a supporting structure for said grating, means for adjusting said supporting structure towards and away from the aperture while maintaining it parallel thereto, means for rotationally adjusting said supporting structure about an axial line at right angles to the plane of said aperture, and means for vertically positioning the supporting structure with respect to said aperture.

SAMUEL B. GRIMSON.